United States Patent [19]
Borrelli et al.

[11] Patent Number: 5,627,676
[45] Date of Patent: May 6, 1997

[54] BIREFRINGENT GLASS WAVEPLATE CONTAINING COPPER HALIDE CRYSTALS

[75] Inventors: Nicholas F. Borrelli, Elmira; Claude L. Davis, Jr., Painted Post, both of N.Y.

[73] Assignee: Corning Incorporated, Corning, N.Y.

[21] Appl. No.: 348,499

[22] Filed: Dec. 2, 1994

[51] Int. Cl.$^6$ ............................................. G02B 5/30
[52] U.S. Cl. ........................ 359/494; 359/485; 359/500
[58] Field of Search ......................... 359/483, 485, 359/494, 500; 385/11

[56] References Cited

U.S. PATENT DOCUMENTS

| | | | |
|---|---|---|---|
| 2,123,901 | 7/1938 | Land | 88/65 |
| 2,158,130 | 5/1939 | Land | 88/65 |
| 2,347,582 | 4/1944 | Ulffers | 88/65 |
| 3,325,299 | 6/1967 | Araujo | 106/52 |
| 3,540,793 | 11/1970 | Araujo et al. | 350/147 |
| 3,954,485 | 5/1976 | Seward, III et al. | 106/47 Q |
| 4,304,584 | 12/1981 | Borrelli et al. | 65/30.11 |
| 4,479,819 | 10/1984 | Borrelli, Jr. et al. | 65/30.11 |
| 5,002,370 | 3/1991 | Okura et al. | 350/375 |
| 5,375,012 | 12/1994 | Borrelli et al. | 359/485 |

FOREIGN PATENT DOCUMENTS 59-64802   12/1984   Japan .

OTHER PUBLICATIONS

Publication by P.D. Hale and G.W. Day, "Stability of Birefringent Linear Retarders (Waveplates)", Applied Optics, 27(24), 5146–53 (1988).

Publication by Takamori and Tomozawa in vol. 59, No. 9–10, pp. 377–379, Journal of the American Ceramic Society, entitled "Birefringence and Microstructure of Anisotropic Borosilicate Glasses".

Applied Optics, vol. 21, No. 24, Dec., 1982, New York U.S., pp. 4526–4532; S.D. Jacobs et al.: "Optical Glass Wave Plates" (p. 4527; figures, 1, 2).

*Primary Examiner*—Paul M. Dzierzynski
*Assistant Examiner*—Darren E. Schuberg
*Attorney, Agent, or Firm*—Milton M. Peterson

[57] ABSTRACT

A birefringent waveplate that is composed of an integral, transparent, glass body, the glass body consisting of non-absorbing crystalline particles dispersed in a glassy matrix, the dispersed crystalline particles being selected from the group consisting of copper chloride, copper bromide and mixtures thereof, the dispersed crystalline particles having a high aspect ratio and being oriented and aligned along a common axis, whereby the waveplate is rendered birefringent so that polarized components of light transmitted through the waveplate have a phase shift introduced.

12 Claims, 1 Drawing Sheet

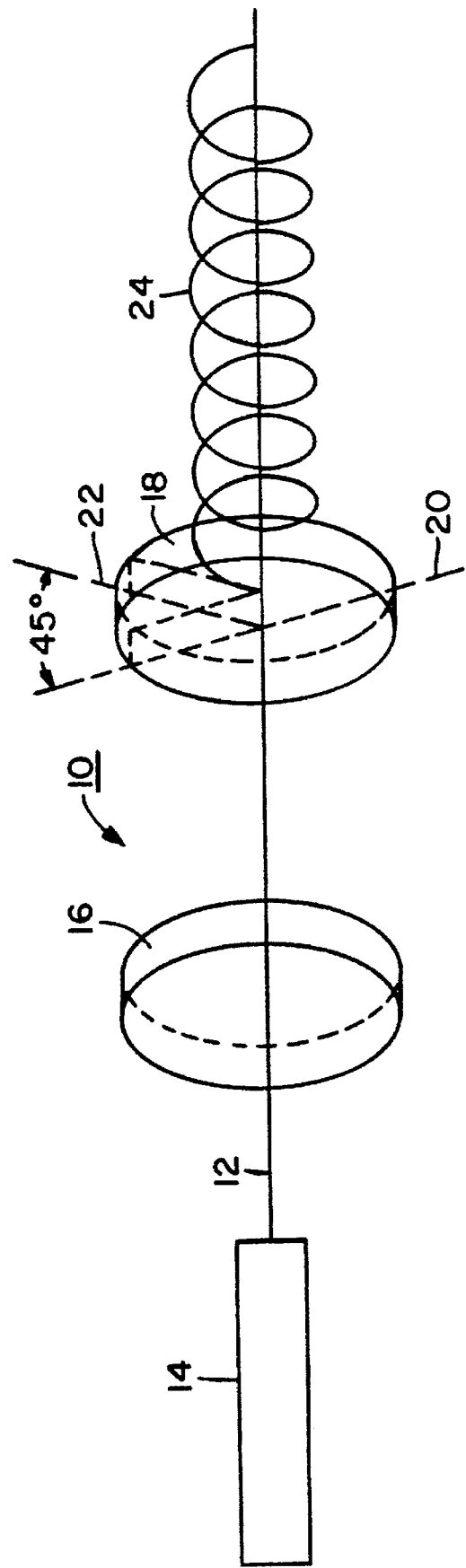

BIREFRINGENT GLASS WAVEPLATE CONTAINING COPPER HALIDE CRYSTALS

RELATED APPLICATIONS

U.S. application Ser. No. 07/959,988, now U.S. Pat. No. 5,375,012, was filed Oct. 13, 1992 by N. F. Borrelli and T. P. Seward, III under the title BIREFRINGENT GLASS WAVEPLATE and assigned to the same assignee as the present application. It is directed to a birefringent waveplate composed of an integral, transparent, glass body having a thermally developed, dispersed phase composed of particles having a high aspect ratio and being oriented and aligned in one direction.

U.S. application Ser. No. 08/270,052, now U.S. Pat. No. 5,517,356, was filed Jul. 1, 1994 by R. J. Araujo et al. under the title GLASS POLARIZER FOR VISIBLE LIGHT and assigned to the same assignee as the present application. It is directed to a glass polarizer that exhibits permanent dichroic behavior and that is effective across the entire visible spectrum of 400-700 nm. The glass has an $R_2O$—$Al_2O_3$—$B_2O_3$—$SiO_2$ base glass composition and a precipitated cuprous and/or cadmium halide crystal phase. The crystals are elongated, and at least a portion of the crystals are partially reduced to colloidal copper.

FIELD OF THE INVENTION

The field is birefringent waveplates and optical systems embodying such waveplates.

BACKGROUND OF THE INVENTION

A waveplate is also referred to as a linear phase retarder, or as a retarder plate. A waveplate introduces a phase shift between components of polarized light transmitted through the plate. It functions in an optical system to modify and control the relative phase of constituent beams.

A waveplate is a body of material in which the refractive index differs along two unique orthogonal directions. As a result, light rays travel at different velocities in the two directions. Consequently, a ray transmitted in one direction is retarded relative to a ray transmitted in the other direction. In crystals, these two transmission directions are often referred to as ordinary and extraordinary ray directions. The path difference $k\lambda$ between the two rays, expressed in wavelengths, is given by $$k\lambda = \pm l(n_e - n_o)$$

where $n_e$=refractive index of the extraordinary ray, $n_o$=refractive index of the ordinary ray, l=physical thickness of the plate, and $\lambda$=wavelength of the light ray.

"k" can be considered the retardation expressed in integrals or fractions of a wavelength. The phase difference between two rays traveling through a birefringent material is $2\pi/\lambda$ times the path difference. Therefore, the phase difference, called the plate retardation $\delta$, may be expressed as, $$\delta = \frac{\pm 2\pi l(n_e - n_o)}{\lambda}$$

Thus, if a phase difference of $\pi/2$ is introduced between the ordinary and extraordinary rays, the plate is termed a quarter-wave plate. The same characterization is true for any condition expressed by $(2\pi)m+\delta$ when "m" is an integer. When "m" is zero, the term zero-order waveplate is used; when "m" is other than zero, the plate is termed a multiple order waveplate.

The simplest retardation plate is a slice cut out of a uniaxial crystal, the slice being cut so that the optic axis lies in a plane parallel to the face of the plate. Heretofore, the principal materials used in waveplate production were crystalline materials such as quartz, calcite and mica. These crystalline materials are well recognized as being highly birefringent. Because of their large birefringent values, the thickness of a zeroth order waveplate would necessarily be impractically thin. For example, the thickness of such a plate would be on the order of 25 microns. Therefore, a practical waveplate, produced from such crystalline materials, must be of a higher order, that is, a multiple of $2\pi$ plus the phase difference.

A recent publication by P. D. Hale and G. W. Day, "Stability of Birefringent Linear Retarders (Waveplates)", Applied Optics, 27 (24), 5146–53 (1988), discusses various types of waveplates and their features. In particular, the publication discusses how retardance in the various types varies with temperature, angle of light ray incidence and wavelength. For example, the effect of a slight deviation in angle of incidence is magnified by the multiple order of retardation inherent in an integral, crystalline waveplate. The term "integral" indicates a unitary, crystalline waveplate composed of a single material.

The authors conclude that, for a waveplate application requiring high stability, a low order, and ideally zero order, waveplate should be chosen. Since a zero-order, integral plate is impractically thin, it is common practice to resort to compound waveplates. Thus, to obtain a 90° retardation (quarter-wave), a positive plate of 360°+90° is sealed to a negative plate of 360°. This provides the desired 90° retardation required with the multiple orders cancelling out.

The related Borrelli-Seward application discloses a birefringent glass waveplate in which non-absorbing, oriented and aligned particles having a high aspect ratio are dispersed in the glass. The particles derive their birefringence through form birefringence. The glass is a phase-separable glass selected from the group consisting of lead borate and bivalent metal oxide silicate glasses and alkali metal oxide aluminosilicate glasses from which silver halide crystals are separated.

These prior waveplates are highly advantageous. However, it would be desirable to provide an increase in the degree of phase shift per unit thickness. The present invention accomplishes this desired end by employing a glass having a different system of dispersed particles.

SUMMARY OF THE INVENTION

Our invention resides in a birefringent waveplate that is composed of an integral, transparent, glass body. The glass body comprises non-absorbing, crystalline particles dispersed in a glassy matrix, the dispersed, crystalline particles being selected from the group consisting of copper chloride, copper bromide and mixtures thereof, the dispersed crystalline particles having a high aspect ratio, and being oriented and aligned along a common axis, whereby the waveplate is rendered birefringent so that polarized components of light transmitted through the waveplate have a phase shift introduced.

BRIEF DESCRIPTION OF THE DRAWINGS

In the accompanying drawing, the single FIGURE is a schematic, perspective view of a circular polarizer in accordance with the invention.

PRIOR ART

In addition to the art already noted, additional art is described in a separate document.

DESCRIPTION OF THE INVENTION

The related Borrelli-Seward application teaches that a birefringent glass can be produced by applying stress to, at a temperature near the glass softening temperature, a glass containing silver halide particles. The stress elongates the particles, and orients and aligns them in the direction of the stress. Initially, the birefringent property went unnoticed because the silver halide was subsequently reduced to a metallic state to render the glass polarizing.

The present application is predicated on discovery that a glass containing copper bromide and/or chloride (CuBrCl) crystals may also be rendered birefringent by applying stress to elongate the crystals. As in the case of the glass containing silver halide crystals, the CuBrCl crystals must not be reduced to the metal. Quite surprisingly, it has been found that the degree of birefringence obtainable in a glass containing CuBrCl particles is substantially greater than that obtained in a silver halide glass.

The present discovery has two significant effects. The thickness of a waveplate for a given degree of birefringence can be reduced. This is important where miniaturization and compactness are essential. Conversely, for a waveplate of given thickness, the degree of birefringence can be increased. This has the potential of meeting requirements for applications in telecommunication equipment.

The birefringent mechanism is termed "form birefringence". The anisotropic behavior stems from the asymmetric depolarization fields of the elongated particle. That is, the dipole moment, $\mu$, is proportional to the local field, through the polarizability, $\alpha$, $$\mu = \alpha E_{loc}$$

and the local field is made up of the external field and the depolarization field, which is taken to be proportional to the polarization, P, $$E_{loc} = E_0 + 4\pi LP$$

The depolarization factor, L, is a function of the shape, or form, of the imbedded particle. The values of L are defined for the convenient symmetry directions of the particle. The sum of the three values of L must equal unity. For a sphere, $L_a = L_b = L_c = 1/3$; for a long cylinder, $L_c = 0$, $L_a = L_b = 1/2$, where the c direction is taken along the axial direction of the cylinder.

The form birefringent property derives from the anisotropic nature of the polarizability. Eliminating $E_0$ between the previous two equations yields the expression for the polarizability. This, in turn, can be expressed as refractive index difference $\Delta n$, as follows, for the two polarizing directions in the material, $$\Delta n = (V_f / 2n_0)(N^2 - 1)\{1/[L_1(N^2 - 1) + 1] - 1/[L_2(N^2 - 1) + 1]\}$$

In this equation, $V_f$ is the volume fraction of the separated phase, $n_0$ is the average refractive index of the glass, N is the ratio of the refractive index of the separated phase to the surrounding phase, and $L_1$ and $L_2$ are the respective depolarization factors for the 1 and 2 directions of the embedded particles. One should note that the larger the value of N is, the larger the resulting n for the same aspect ratio of the particle.

The birefringent characteristics of a glass containing elongated, CuBrCl particles, taken with the inherent thermal and environmental stability of such a glass, renders it particularly useful for waveplate purposes. Thus, the degree of birefringence permits producing a zero order waveplate in an integral body having a practical thickness because the value of N is of the order of 2.1/1.5=1.4. In addition, the magnitude of the birefringence permits producing a zero order waveplate in an integral body having a practical thickness. With wavelengths in the visible range, plate thicknesses of 0.5 to 1.5 mm are possible. Somewhat greater thicknesses may be required in the infra-red range, but are still practical.

For waveplate purposes, a glass containing CuBrCl particles is subjected to only the step of elongating the particles under stress, at an elevated temperature. Glass composition families and elongation conditions are described in considerable detail in the related applications. Both the composition and treatment conditions are equally applicable for present purposes. Accordingly, the disclosures of the applications are incorporated by reference herein in their entirety.

In general, any glass containing CuBrCl particles, whether photochromic or simply phase separated, may be employed. Also, stress may be applied by any known means at a temperature generally in the range between the annealing temperature and the softening point of the glass. There are, however, other significant factors that must be considered in producing an acceptable waveplate.

One of these factors is the amount of light scattering that can be tolerated. Light scattering is related to the size and aspect ratio of the particle involved. Therefore, the particle size of the CuBrCl produced during an initial glass heat treatment must be balanced against the degree of light scattering permitted.

The ideal waveplate particle would have a high aspect ratio, preferably greater than 5:1. At the same time, it should be of minimal size in both dimensions to minimize light scattering.

In the case of photochromic glasses, the photochromic behavior might need to be eliminated. Alternatively, a closed optical system, or a suitable UV blocking filter, may be employed. Otherwise, ambient UV radiation tends to activate the crystals and darken the glass. Thus, non-photochromic glasses are generally preferred. However, where the wavelength of use of the waveplate is beyond the wavelength of the photochromic absorption band, e.g. beyond 800 nm, no appreciable absorption is observed.

As indicated earlier, the phase shift of a waveplate may be expressed as, $$\delta = \frac{2\pi l \Delta n}{\lambda}$$

where l is the thickness of the waveplate. The desire for a thinner glass waveplate has been recognized; also, the desirability of increasing the phase shift obtainable per unit thickness.

The form birefringence, $\Delta n$, is determined by the aspect ratio of the elongated particle, the number of particles per unit volume, and the ratio of the refractive indices between the elongated phase and the matrix glass. The increase in the effect from the aspect ratio is controllable by the applied stress. It is essentially constant after an aspect ratio of about 5/1 is achieved. Further, the index ratio of elongated to matrix phase is difficult to change in a significant way.

This leaves the particle number density as the most efficacious route to increasing the phase shift per millimeter. To a large extent, this is determined by solubility of the halide constituents that can be achieved in the glass; also, to the ability to bring those constituents out of solution upon reheating.

The present invention then stems in large measure from our discovery that the CuBrCl system enables us to increase the amount of halide phase that can be precipitated from a glass. In particular, the amount of CuBrCl particles that can be precipitated per unit volume of glass is substantially greater than the amount of silver halide particles obtained in practicing the invention of the related application.

Certain conditions are essential, in either a photochromic or non-photochromic type glass, to produce a CuBrCl crystal phase. The base glass must be an $R_2O$—$Al_2O_3$—$B_2O_3$—$SiO_2$ glass. The glass batch must contain a source of copper, as well as a source of halogen selected from chlorine and bromine. To produce the present birefringent glass, the following additives, in weight percent based on the glass, are considered desirable: 0.4–1.0% CuO, 0.5–1.0% SnO, and a halogen selected from the group consisting of 0.25–1.0% Cl, 0.25–1.0% Br and 0.25–1.5% Cl+Br.

The crystal phase may be precipitated in the glass as a formed article is cooled. However, it is generally desirable to cool the glass rapidly, thereby avoiding crystal development. Then, the glass may be reheated to precipitate the CuBrCl crystal phase. To this end, the glass is heated above its strain point, but below about 900° C. Generally a temperature in the range of 650°–850° C. is preferred for this purpose, although temperatures in the range of 500°–900° C. are contemplated.

To provide CuBrCl crystals in the glass, the glass composition requires at least 0.2 weight percent cuprous oxide ($Cu_2O$), preferably at least 0.4%. Up to about 2% $Cu_2O$ may be employed, but cuprous ions tend to disproportionate into cupric ions and neutral atoms at such higher levels. Therefore, the preferred maximum $Cu_2O$ content is about 1.0% by weight. The cuprous ion imparts no visible color to the glass, whereas the cupric ion generally provides a blue-green color.

The oxidation state of the copper is influenced by the temperature at which the glass batch is melted, by the partial pressure of oxygen to which the molten batch is exposed, by the concentration of polyvalent ions in the glass, and by the basicity (the R-value) of the glass. The oxides of arsenic, antimony and tin are illustrative of polyvalent metal oxides that are especially useful since they do not directly impart color to the glass.

Chlorine or bromine must be present to combine with the copper to form the necessary crystal phase. Iodine is also effective, but is not normally employed. The inclusion of fluorine may be useful, but it does not produce cuprous halide crystals in the absence of chlorine or bromine.

A particularly significant control factor is the R-value, a measure of the basicity of a glass. This value is expressed in cation % on an oxide basis as calculated from the formula:

$$R = \frac{M_2O + 2MO - Al_2O_3 - ZrO_2}{B_2O_3}$$

$M_2O$ designates alkali metal oxides, and MO represents alkaline earth metal oxides. Cuprous halide crystals can be developed in glasses with R-values below 0.15. Nevertheless, the development is slow, there is no substantial advantage in these glasses, they tend to be difficult to melt and they have poor chemical durability. Glasses with an R-value greater than 0.30 do not provide the desired crystal phase, except under certain compositional conditions. Glasses with a value over 0.45 are not suitable under any condition. Glasses with an R-value of about 0.25 are generally optimal for the development of a cuprous halide crystal phase.

TABLE I, below, sets forth, in terms of oxides and halogens, the approximate ranges, in weight percent, for compositions for glasses in which CuBrCl crystals can be precipitated in the glass. The first column identifies the composition components; the second column, the ranges for non-photochromic (Non-PC) glasses; the third column, ranges for all glasses within the scope of the present invention (Cons.).

TABLE I

| Comp. | Non-PC | Cons. |
| --- | --- | --- |
| $SiO_2$ | 48–80 | 40–80 |
| $B_2O_3$ | 10–35 | 4–35 |
| $Al_2O_3$ | 0–12 | 0–26 |
| $Li_2O$ | 0–4 | 0–8 |
| $Na_2O$ | 0–14 | 0–15 |
| $K_2O$ | 0–12 | 0–20 |
| $Li_2O+Na_2O+K_2O$ | 4–15 | 2–20 |
| $CaO+BaO+SrO$ | 0–10 | 0–10 |
| $Cu_2O$ | 0.2–1.6 | 0.2–2 |
| CdO | 0–2 | 0–2 |
| $ZrO_2$ | 0–12 | 0–12 |
| $SnO_2$ | 0–2.5 | 0–2.5 |
| $As_2O_3+Sb_2O_3$ | 0–2 | 0–2 |
| Cl | 0–1.75 | 0–2 |
| Br | 0–1.0 | 0–2 |
| Cl+Br | 0.25–2.0 | 0.25–2.0 |
| F | 0–2 | 0–2 |
| R-value | 0.15–0.45 | 0.15–0.45 |

TABLE II sets forth some typical photochromic glass compositions in terms of oxides and halogens. These compositions are calculated from the glass batch in parts by weight approximating 100. It will be appreciated that up to 25% of the copper, and up to as much as 60% of the halogen content, may be lost during melting of the batch.

TABLE II

|  | 1 | 2 | 3 | 4 | 5 | 6 |
| --- | --- | --- | --- | --- | --- | --- |
| $SiO_2$ | 58.3 | 55.2 | 58.4 | 57.7 | 59.2 | 59.5 |
| $Al_2O_3$ | 9.0 | 12.0 | 9.0 | 9.0 | 9.5 | 11.4 |
| $B_2O_3$ | 20.0 | 20.0 | 20.0 | 20.0 | 20.1 | 17.4 |
| $Na_2O$ | 10.1 | 10.0 | 10.0 | 10.0 | 4.4 | 5.7 |
| F | 1.4 | 0.7 | 1.2 | 1.5 | — | — |
| Cl | 0.9 | — | 0.9 | 0.9 | 0.5 | 0.5 |
| Br | — | 1.5 | — | — | 0.5 | 0.5 |
| Cu | 0.5 | 0.3 | 0.5 | 0.9 | 0.4 | 0.58 |
| Cd | — | 0.3 | — | — | — | — |
| $Li_2O$ | — | — | — | — | 1.9 | 2.0 |
| $K_2O$ | — | — | — | — | 2.9 | 1.5 |
| $SnO_2$ | — | — | — | — | 0.5 | 0.66 |

TABLE III sets forth several typical compositions for non-photochromic glasses. The compositions are presented in terms of oxides and halogen contents as calculated from the batch in parts by weight approximating 100. Again, analyses will show substantially lower copper and halogen contents.

All of the compositions shown in TABLES II and III represent glasses suitable for producing articles in accordance within the present invention.

TABLE III

|  | 7 | 8 | 9 | 10 | 11 | 12 |
|---|---|---|---|---|---|---|
| $SiO_2$ | 56.6 | 52.6 | 77.5 | 56.5 | 55.8 | 72.8 |
| $Al_2O_3$ | 8.5 | 4.4 | 1.9 | 9.4 | 8.4 | 0.3 |
| $B_2O_3$ | 25.3 | 17.7 | 13.6 | 19.0 | 24.9 | 21.2 |
| $Li_2O$ | 4.0 | 1.0 | — | 1.1 | 2.6 | 0.4 |
| $Na_2O$ | 3.6 | 7.8 | 3.9 | 8.5 | 6.3 | 1.2 |
| $K_2O$ | — | 1.3 | — | 1.5 | — | 1.4 |
| $ZrO_2$ | — | 10.6 | — | — | — | — |
| $SnO_2$ | 0.6 | 1.0 | 0.6 | 0.9 | 0.6 | 0.6 |
| CuO | 0.4 | 0.8 | 0.5 | 0.8 | 0.4 | 0.5 |
| Cl | 0.6 | 0.6 | 0.9 | 0.3 | 0.6 | 1.0 |
| Br | 0.4 | 0.4 | 0.5 | 0.3 | 0.4 | 0.7 |
| F | — | 1.8 | 0.8 | 1.8 | — | — |

Glass batches were formulated on the basis of compositions 5 and 6 using standard glass-making materials including sand, alumina, oxides, carbonates and halides. The batches were ballmilled to ensure homogeneity, and melted in covered crucibles. A 22 Kg (10 lb.) batch for each glass was formulated, mixed and melted for 6 hours at 1450° C. For test purposes, bars having dimensions of 6.25×1.25×70 cms. (2.5"×0.5"×28") were poured from the melts into molds.

Bars cast from the melts were selected for further treatment. The bars were heat treated for 75 minutes at the glass softening point to form the requisite crystal phase. The bars were then heat treated at different temperatures and stretched under different stresses to provide samples for birefringent measurements.

TABLE IV sets forth the temperatures to which the bars were heated for stretching, the pulling stress at these temperatures and the time period during which stress was applied. Temperatures are in °C.; pulling stresses are in Mp·as (psi); time in minutes; birefringence in degrees/mm. Birefringence was measured at a wavelength of 633 nanometers in radial degrees per mm of glass thickness.

TABLE IV

| Glass | Temp. | Time | Stress | Birefringence |
|---|---|---|---|---|
| 5 | 725 | 75 | 19.3 (2800) | 128 |
| 5 | 750 | 75 | 19.3 (2800) | 180 |
| 6 | 700 | 60 | 20.7 (3000) | 116 |
| 6 | 700 | 60 | 34.5 (5000) | 191 |
| 6 | 725 | 75 | 20.7 (3000) | 186 |
| 6 | 725 | 75 | 34.5 (5000) | 230 |

Glass 5 contained $0.82 \times 10^{20}$ Cu ions per $cm^3$; glass 6 contained 1.17 Cu ions per $cm^3$.

It is apparent from TABLE IV that birefringence is proportional to the Cu concentration. Thus, under identical conditions, the birefringence induced in glass 6 is 1.5 times that induced in glass 5. This correlates with Cu concentrations in the glasses.

For comparison, a commercial photochromic glass containing 0.215 wt. % Ag ($0.3 \times 10^{20}$ Ag ions/$cm^3$) as silver chloride was heated, stretched and measured. One sample was stressed for 60 minutes at 700° C. under a pulling stress of 40 Mp·as (5800 psi); a second sample was stressed for 60 minutes at 725° C. under a pulling stress of 40 Mp·as (5800 psi).

When measured at 633 nm, the first sample showed a birefringence of 125 degrees/mm, the second sample measure 170 degrees/mm. The comparison shows that copper-containing glass 6 yields a 30–50% higher birefringence than the silver-containing glass when treated under similar conditions.

The invention is further described with reference to the accompanying drawing wherein the single FIGURE is a schematic, perspective view of the components and operation of a circular polarizer 10. Thus, a beam of light 12, from a laser 14, for example, passes through a polarizer 16 where it is linearly polarized. The beam then proceeds to, and passes through, a waveplate 18. If the crystalline optic axis 20 of waveplate 18 is set at an angle of 45° to the input polarization plane 22, as shown, the emergent light is circularly polarized, that is, its electric field vector traces out a helical path 24 as it propagates.

I claim:

1. A birefringent waveplate that is composed of an integral, transparent, glass body, the glass body comprising non-absorbing, crystalline particles dispersed in a glassy matrix, the dispersed crystalline particles being selected from the group consisting of copper chloride, copper bromide and mixtures thereof, the dispersed crystalline particles having a high aspect ratio and being oriented and aligned along a common axis, whereby the waveplate is rendered birefringent so that polarized components of light transmitted through the waveplate have a phase shift introduced and wherein the glass body has a composition comprising, in weight percent calculated from the glass batch,

| | |
|---|---|
| $SiO_2$ | 40–80 |
| $B_2O_3$ | 4–35 |
| $Al_2O_3$ | 0–26 |
| $Li_2O$ | 0–8 |
| $Na_2O$ | 0–15 |
| $K_2O$ | 0–20 |
| $Li_2O + Na_2O + K_2O$ | 2–20 |
| $CaO + BaO + SrO$ | 0–10 |
| $Cu_2O$ | 0.2–2 |
| CdO | 0–2 |
| $ZrO_2$ | 0–12 |
| $SnO_2$ | 0–2.5 |
| $As_2O_3 + Sb_2O_3$ | 0–2 |
| Cl | 0–2 |
| Br | 0–2 |
| Cl + Br | 0.25–2.0 |
| F | 0–2 |
| R-value | 0.15–0.45 |

2. A birefringent waveplate in accordance with claim 1 wherein the glass body further comprises 0.4–1.0% CuO, 0.5–1.0% SnO and a halogen selected from the group composed of 0.25–1.0% Br, 0.25–1.0% Cl and mixtures thereof, the total Br+Cl being 0.25–1.5%.

3. A birefringent waveplate in accordance with claim 1 wherein the glass is non-photochromic.

4. A birefringent waveplate in accordance with claim 1 wherein the glass body is a thin sheet having a thickness in the range of 0.5 to 5.0 mm.

5. A birefringent waveplate in accordance with claim 4 wherein the glass thickness is in the range of 0.5 to 1.5 mm.

6. A birefringent waveplate in accordance with claim 1 wherein the waveplate has a zero order phase shift.

7. A birefringent waveplate in accordance with claim 1 wherein the geometry of the glass body is a compound curvature.

8. A birefringent waveplate in accordance with claim 7 wherein the curvature is spherical.

9. A birefringent waveplate in accordance with claim 1 wherein the birefringence is at least 175 degrees/mm of glass thickness as measured at 633 nm.

10. A birefringent waveplate in accordance with claim 1 wherein the crystalline particles have an aspect ratio of at least 5:1.

11. A birefringent waveplate in accordance with claim 1 wherein the copper ion content is at least $0.8 \times 10^{20}$ per $cm^3$.

12. A circular polarizer comprising a polarizer element in conjunction with a birefringent waveplate in accordance with claim 5 and that is composed of an integral, transparent glass body, the glass body comprising non-absorbing crystalline particles dispersed in a glassy matrix, the dispersed crystalline particles being selected from the group consisting of copper chloride, copper bromide and mixtures thereof, the dispersed crystalline particles having a high aspect ratio and being oriented and aligned along a common axis, whereby the waveplate is rendered birefringent so that polarized components of light transmitted through the waveplate have a phase shift introduced.

* * * * *